United States Patent [19]
Juengel et al.

[11] 4,207,567
[45] Jun. 10, 1980

[54] BROKEN, CHIPPED AND WORN TOOL DETECTOR

[75] Inventors: Richard O. Juengel, Romeo; Kenneth J. Cook, Troy, both of Mich.

[73] Assignee: The Valeron Corporation, Oak Park, Mich.

[21] Appl. No.: 852,341

[22] Filed: Nov. 17, 1977

[51] Int. Cl.² .............................................. G08B 21/00
[52] U.S. Cl. .................................... 340/680; 73/104; 408/16
[58] Field of Search ................ 340/680, 664; 408/11, 408/6, 16; 73/104

[56] References Cited

U.S. PATENT DOCUMENTS

| | | | |
|---|---|---|---|
| 3,545,310 | 12/1970 | Porath et al. | 408/11 |
| 3,809,870 | 5/1974 | Auble et al. | 73/104 |
| 3,930,248 | 12/1975 | Keller | 340/680 |
| 3,962,694 | 6/1976 | Calia et al. | 340/680 |
| 4,023,044 | 5/1977 | Miller et al. | 340/680 |
| 4,076,442 | 2/1978 | Cox, Jr. et al. | 408/11 |
| 4,087,801 | 5/1978 | Noh | 73/104 |
| 4,090,403 | 5/1978 | Tsukada et al. | 73/104 |

*Primary Examiner*—Glen R. Swann, III
*Attorney, Agent, or Firm*—Krass & Young

[57] ABSTRACT

A method and apparatus for monitoring tool wear and breakage as a function of the electrical power dissipated by a machine tool which is carrying out subsequent cuts for removing stock. Optimal tool life is achieved by monitoring tool wear and breakage as a function of the power dissipated by a machine tool by monitoring said power, storing pertinent selected values thereof associated with successive cuts of the tool and periodically comparing the stored values with one another to determine if the difference therebetween exceeds a predetermined limit value, in which case the operator is warned and/or the machine tool is de-energized. The analysis phase can be carried out by a general-purpose microprocessor or discrete digital or analog components.

4 Claims, 6 Drawing Figures

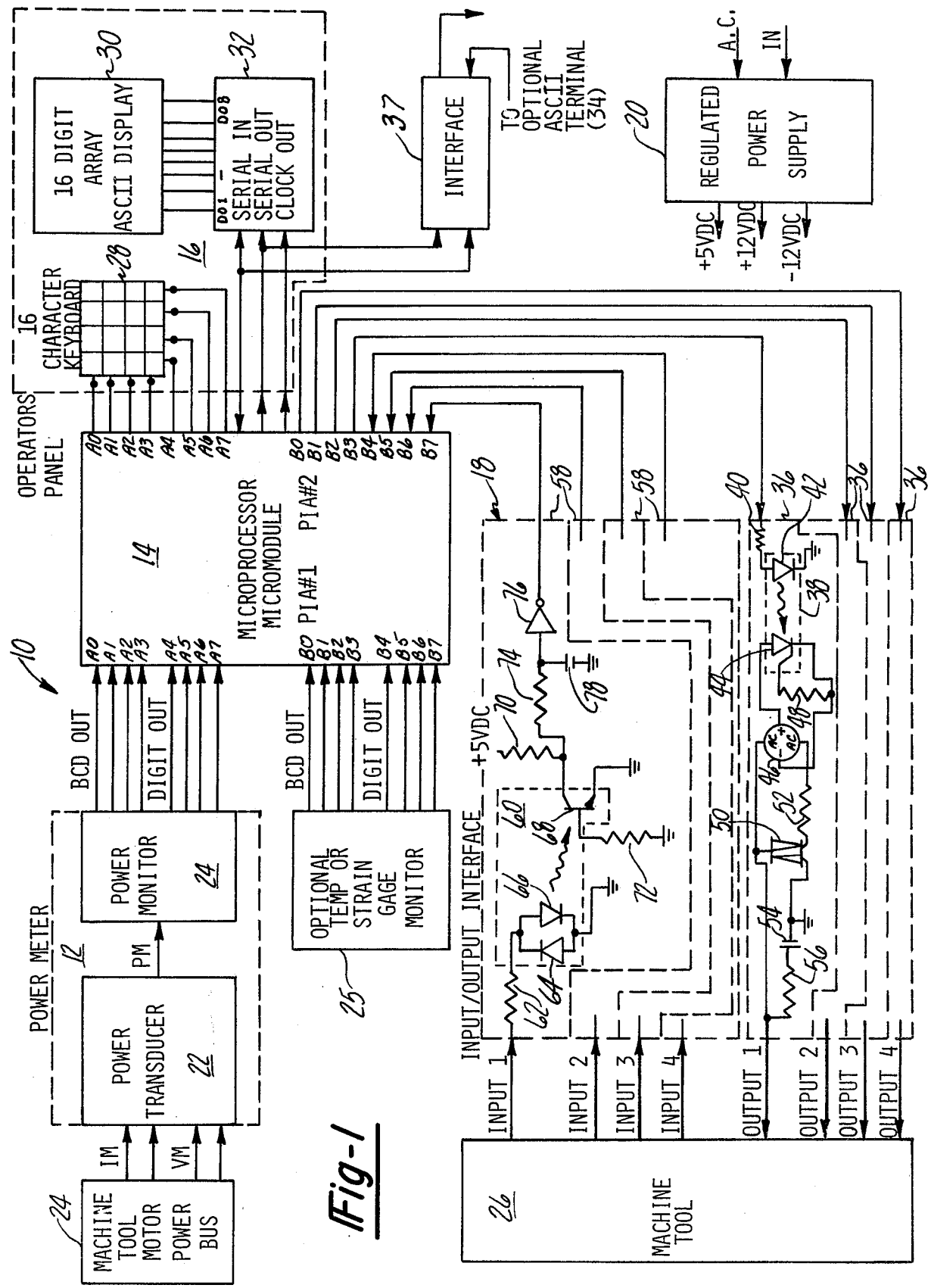

BROKEN, CHIPPED AND WORN TOOL DETECTOR

INTRODUCTION

This invention relates to methods and apparatus for the detection of broken, chipped or worn cutting tools during use and specifically to a broken, chipped and worn tool detector which monitors the electrical power consumed by a machine tool and determines the condition of the cutting tools therein by analyzing an electrical signal corresponding to the power consumption.

BACKGROUND OF THE INVENTION

A major concern in the operation of machine tools is the maintenance of the cutting tools therein. It is important to immediately identify tools which have become worn, chipped or broken. Historically, on relatively simple machine tools, the operator would continue using a cutting tool until it was visibly worn out or broken. The "use until failure" method results in the production of workpieces having cuts of varying precision as the tool becomes dull. More recently, as machine tools have become more sophisticated and complex, such as with the use of multiple, remotely operated cutting tools, it has become increasingly important to continuously monitor all of the cutting tools, for if a broken tool is undetected, the continuation of work may damage the workpiece and the other cutting tools as well as the machine tool itself. Additionally, an unanticipated tool failure will necessitate a machine shutdown which can adversely effect an entire manufacturing facility.

Preventive maintenance programs which involve the periodic replacement of cutting tools before they wear out have been adopted. Although such programs have the advantage of permitting predicted down-time, such as in the evening or between work shifts, it introduces waste in that tools with some useful life remaining are discarded. Accordingly, to maximize machine tool efficiencies and to minimize waste, it is important to monitor individual cutting tools and to accurately determine the amount of wear of each as well as to immediately signal the operator and/or shut-down the machine should a catastrophic failure occur.

In the prior art, the subject of broken, chipped or worn tool detection has been approached in many ways. Most techniques involve the mechanical monitoring of a cutting tool or its associated workpiece. Wear detection has been accomplished by vibration analysis, receiving an electrical signal from a switch embedded in the cutting tool at a predetermined wear point and releasing a highly visible or odor producing substance such as die or gas contained within the cutting tool at a predetermined wear point. Although tool breakage is typically detected visually, the prior art has also employed mechanical probes which "feel" the cutting tool, electrical reluctance sensors which detect the movement of tool flutes and light or radio-active sensors which detect the presence or absence of a cutting tool. In the prior art, when a cutting tool tip chips, if not clearly visible to the operator, the tool will typically continue in operation until it fails catastrophically, causes a substantial vibration or otherwise manifests itself. Representative prior art devices are disclosed in U.S. Pat. No. 2,461,164; 3,079,821; 3,627,437; 3,669,557; and 3,994,612.

An additional drawback in prior art devices is that they typically require a sensor probe or the like in the immediate proximity of the cutting tool and workpiece. In highly complex machine tools, particularly those employing closely spaced multiple cutting tools, space is at a premium and such sensors may inhibit the movement or replacement of the cutting tools and/or the workpiece. Additionally, such mechanisms are typically complex and expensive. Finally, they are frequently limited as to function such as only the detection of the presence or absence of a specifically shaped cutting tool or merely the amount of wear of a given tool.

BRIEF DESCRIPTION OF THE INVENTION

The present invention provides a device which detects worn, chipped and broken cutting tools in a machine tool carrying out repetitive machining operations which does not require any form of sensor in the proximity of the cutting tool, the machine spindle or the workpiece. The device is relatively inexpensive and can be universally applied to virtually any machine took configuration. In general, the embodiment of the invention comprises a power monitor connected to the electrical bus feeding the machine tool motor which generates a signal related to the power dissipated by the machine tool. A logic circuit receives the signal and analyzes it by periodically comparing pertinent selected values therein which are associated with the successive cuts made by the machine tool. The logic circuit contains storage means which stores the selected values of the power signal, the stored values being periodically compared within the logic circuit. The difference between the compared values is then compared with a preset limit value. If the difference between the two compared values exceeds the preset limit value, the logic network generates a switching signal which warns the operator and/or de-energizes the machine tool.

The preferred embodiment of the invention is implemented with programmable logic devices and commercially available power and temperature monitors. The preferred logic device is a microprocessor which is interfaced with a machine tool and an operator's panel. The operator's panel contains an alpha-numeric display and keyboard which allows two-way communication between the operator and the system. An input/output module interfaces the microprocessor and machine tool permitting the monitoring and control of the host machine circuits.

In operation, the preferred embodiment of the invention is programmed by placing it in a learn-mode and performing the desired machining operation or operations. The system is scheduled to request information from the operator during this phase and the operator responds by entering the appropriate data or responses via the keyboard. A number of operations are made until the tool either breaks, wears out or, in the operator's opinion, becomes unusable. The system analyzes the data obtained and reduces it to an algorithm which can be stored in microprocessor memory for future reference. The power versus time curve for the operation is examined for deviations which indicate a chpped or broken tool, and the increase in peak power used for each operation is examined and used to project when the tool has or will reach the wear limit. After the programming operation, the system is switched to a run mode whereby the system analyzes the input data and compares it with the stored data during the machining operation. The system responds with an alarm or shut down of the machine if the data is not within preset limits of that stored within the memory.

Optional features, such as temperature or strain gage monitors, can be included in the preferred embodiment of the invention if those parametric inputs are required in the determination of the status of the tool or tools being monitored. For example, the failure of a cutting tool to receive necessary coolant or lubrication may be most easily detected as a function of tool temperature. If the tool temperature exceeds a preset value, the machine tool can be shut down.

In an alternate embodiment of the invention, discrete devices are employed for the logic network. The alternative embodiment may employ either an analog approach utilizing peak and hold detectors, difference, absolute value and comparator circuits, or a digital approach utilizing comparators and storage registers. In the analog version of the alternative embodiment of the invention, power-time curve is presented to an analog gate which is routed to a first peak detector. On the next machine cycle, the analog signal is routed to a second peak detector. The outputs of the two peak detectors are presented to a difference amplifier, the output of which represents the difference between the two signal peaks. This difference signal is fed to an absolute value amplifier and then to one input of a comparator. The other input of the comparator is a predetermined set point signal. If the absolute value of the difference between the two peak values exceeds the set point value, the output of the comparator will trigger a DC/AC solid state switch to signal the operator or de-energize the machine tool. A logic control circuit is provided to receive cycle information from the machine and to switch the analog gage, reset the two peak detectors and to enable the comparator, thereby assuring a valid signal being transmitted to the DC/AC switch.

The digital version of the alternative embodiment of the invention accomplishes the same objective as the analog system. The main advantage of using digital techniques is that the peak detector can store information for long periods of time without signal droop. Also, digital systems typically have a higher noise immunity than analog circuits in this application. A power monitor has an output which is a 13-bit word that is periodically updated, and an end of conversion (EOC) pulse that is produced at each new update. The 13-bit word is stored in a 13-bit D-type storage register and then compared with the next succeeding word. At each comparison, the larger of the two words is stored, thus maintaining the peak reading. The stored peak value is then transferred to a 13-bit storage register so that the 13-bit D-type storage register and the comparator can track and hold a new peak value. These two peak values are then compared and their difference is compared with a preset limit value. If the preset limit value is less than the difference, a DC/AC switch is energized during the enable time from a logic control to indicate a chipped or broken tool.

Both the preferred embodiment and alternative embodiments of the invention provide a relatively inexpensive detector of broken, chipped and dull tools as well as a device which is substantially universally adaptable to virtually any machine tool/cutting tool combination. Various other features and advantages of this invention will become apparent upon a reading of the following specification, which along with the drawings, describes and discloses a preferred illustrative embodiment of the invention in detail.

BRIEF DESCRIPTION OF THE DRAWINGS

FIG. 1 is a detailed block/schematic diagram of a preferred embodiment of the invention;

DETAILED DESCRIPTION

Figure 2A:
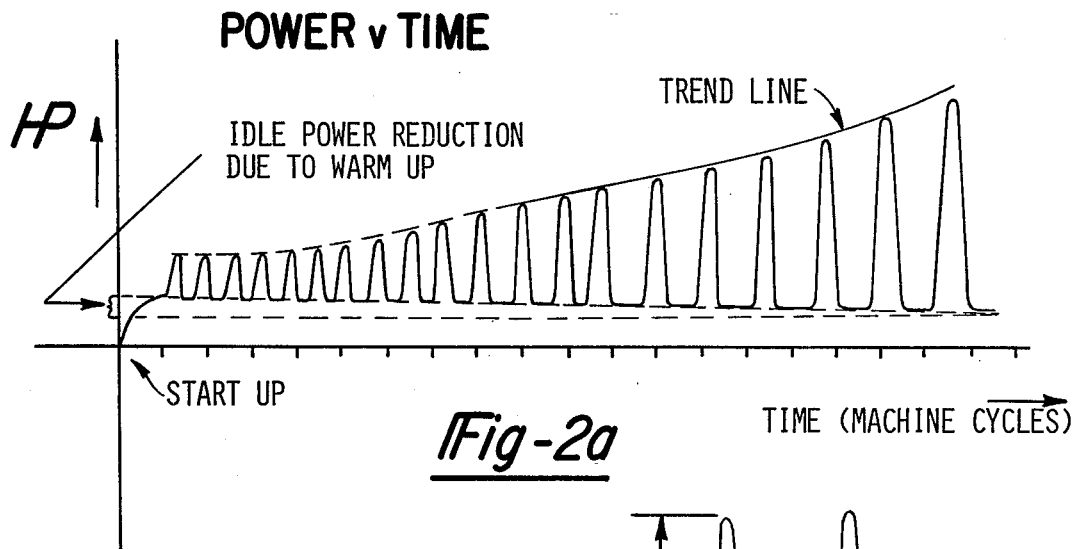
FIG. 2A is a power-time curve of the power consumed by a typical machine tool over a number of cycles of operation

Referring to FIG. 1, a block/schematic diagram of the preferred embodiment of the invention is illustrated. A worn, chipped and broken tool detector 10 comprises a power meter 12, a microprocessor 14, an operator's panel 16, an input/output (I/O) interface 18 and a regulated DC power supply 20. The power meter 12 is composed of a power transducer 22 and a power monitor 24. The transducer 22 is of the type manufactured by The Valeron Corporation of Oak Park, Michigan, type 720-XXX. The inputs of the power transducer 22 are electrically connected to the power bus 24 of a machine tool 26. The inputs of the transducer 22 read the voltage across, and current flowing through, the machine tool 26. The output of the power transducer 22 is a signal proportional to the power dissipated by the machine tool 26. The power monitor 24 receives this power signal, filters it and translates it to a binary-coded decimal (BCD) output, a technique which is well known to those skilled in the art. The power monitor 24 is of the type manufactured by The Valeron Corporation, model 720-001. It is contemplated that any equivalent power meter adapted to read the current through and voltage across a given load and generate a BDC output signal could be substituted in place of the power transducer 22 and power monitor 24. Additionally, various power transducers 22 are available, the exact model numbers of which will vary depending upon the application or the line voltage and current associated with the machine tool 26.

The power meter 12 has a four parallel line BCD output and a four parallel line digit select output. The eight parallel outputs of the power meter 12 are electrically connected to input terminals $A_0$ through $A_7$, respectively, of the first peripheral interface adapter (PIA) of the microprocessor 14. The microprocessor 14 is preferably but not exclusively of the type manufactured by Motorola, model M68MM01A. For the purpose of this specification, the designated terminal numbers are those associated with the particular unit employed in the specific embodiment. However, it is contemplated that other equivalent devices could be substituted.

An optional temperature monitor 25 of the type manufactured by Sensors, Inc. of Ann Arbor, Michigan, model 1150 has four-line BCD data and digital select outputs which are electrically connected to the corresponding eight inputs $B_0$ through $B_7$ of PIA-1 of the microprocessor 14. It is contemplated that other similar equivalent devices could be substituted or a strain gage monitor which also is readily available in the market could be substituted. The temperature monitor 25 is located in the proximity of the cutting tool to monitor the temperature thereof by means well known to those skilled in the art.

The operator's panel 16 comprises a 16-character keyboard 28 of the type manufactured by Bowmar, Model KBA3201, a 16-digit array, American Standard Communications Information Interchange (ASCII) display 30 such as that manufactured by Litronix, Model DL1416, and a universal asynchronous receiver/transmitter (UART) 32 such as that manufactured by General Instrument Corporation, Model AY-5-1013. The four-row output terminals of the keyboard 28 are electrically connected to input terminals A0 through A3 of PIA-2 of the microprocessor 14 and the four-column output terminals of keyboard 28 are electrically connected to the input terminals A4 through A7 of PIA-2 of the microprocessor 14. The keyboard 28 provides direct operator access to the microprocessor 14. The serial input, serial output and clock output terminals of PIA-2 of the microprocessor 14 are electrically connected to their corresponding input terminals of the UART 32. The eight data output terminals $DO_1$ through $DO_8$ of the UART 32 are electrically connected in parallel with the corresponding input terminals of the 16-digit array ASCII display 30. The serial port of the microprocessor 14 drives the display 30 through the UART 32 which serves as a serial to parallel converter. The serial port is also available for connection to an ASCII terminal 34 through an interface 37 if external information storage is desired such as automatic record keeping or reporting.

Each output terminal $B_0$ through $B_7$ of PIA-2 of the microprocessor 14 is electrically interconnected to the control circuitry of a machine tool 26 through the I/O interface 18. Each said terminal serves as an input or output to monitor or control an operation of the machine tool 26. Output terminals $B_0$ through $B_3$ of PIA-2 of the microprocessor 14 are each electrically connected to an output interface section 36 which serves to filter and isolate the microprocessor 14 from the machine tool 26. Each output section 36 is identical and a description of one will suffice. Output terminal $B_3$ of PIA-2 of the microprocessor 14 is electrically connected to the input of an optical coupler 38 through a 470Ω current limiting resistor 40. The optical coupler 38 is of the type manufactured by General Electric, Model GEH11C1 under the trademark "OPTO-COUPLER". It is contemplated, however, that other equivalent units could be substituted. Within the coupler 38, one terminal of a light-emitting diode (LED) 42 receives the input signal. The other terminal of the LED 42 is connected externally to ground. A photo-silicon controlled rectifier (SCR) 44 receives the light from the LED 42. The anode of the photo-SCR 44 is electrically connected to the positive input of a bridge rectifier 46 such as that manufactured by Motorola, Model MDA942. The cathode of the photo-SCR is electrically connected to the negative input of the bridge rectifier 46. The gate of the photo-SCR 44 is electrically connected to the negative input of the bridge rectifier 46 through a series 56KΩ resistor 48. The resistor 48 controls the sensitivity of the photo-SCR 44 by preventing it from being triggered by spurious wave spikes. One AC output terminal of the bridge rectifier 46 is connected to an anode of a triac 50 of the type manufactured by General Electric Model SC1460. The other AC terminal of the bridge rectifier 46 is electrically interconnected to the gate of the triac 50 through a series 150Ω current limiting resistor 52. The heretofore unused anode of the triac 50 is electrically connected to ground and interconnected to the output of the output interface section 36 through a series combination of a 0.05 microfarad capacitor 54 and a 82Ω resistor 56. The resistor 56 and capacitor 54 constitute a snubber network which absorbs transient spikes from inductive kickbacks.

The above described output interface section 36 is typical of four sections provided in the detector 10, one each being associated with output terminals $B_0$ through $B_3$ of PIA-2 of the microprocessor 14. The output of each interface section 36 is electrically connected to control circuitry of the machine tool 26 to provide such functions as the activation of drive relays, alarms or to shut down the machine upon command from the microprocessor 14.

Terminals $B_4$ through $B_7$ of PIA-2 of the microprocessor 14 are each electrically connected to an input interface section 58 of the I/O interface 18. Each of the four sections 58 are identical and a thorough explanation of one will be sufficient. The input of the input interface section 58 is electrically connected to the control circuitry of the machine tool 26. The input is electrically interconnected to an optical coupler 60 through an 8.2KΩ current limiting resistor 62. The optical coupler 60 is manufactured by General Electric, Model GEH1AAI which is sold under the trademark "OPTO-COUPLER". In the coupler 60, the input is fed to ground through a parallel combination of a reversed biased diode 64 and a forward biased LED 66. The light from the LED is received by a phototransistor 68. The emitter of the phototransistor 68 is electrically connected to ground and its collector is electrically interconnected to the +5 VDC regulated power terminal of the output power supply 20 through a 10KΩ logic level reference resistor 70. The base of the phototransistor 68 is electrically connected to ground through a 2MΩ resistor 72 which assures that the phototransistor 68 is shut off in the absence of an input signal. The collector of phototransistor 68 is also electrically connected to one side of a 4.7KΩ resistor 74. The other side of the resistor 74 is electrically interconnected to the input terminal $B_7$ of PIA-2 of the microprocessor 14 through a Schmidt trigger 76 of the type manufactured by National Semi Conductor, Model 74C14. The operation of a Schmidt trigger is well known to those skilled in the art and a detailed explanation is not required here. It is contemplated that other equivalent units could be substituted. The input of the Schmidt trigger 76 is electrically interconnected to ground through a 0.1 microfarad capacitor 78. The resistor 74 and capacitor 78 comprise an RC filter which eliminates spurious spikes from the input signal. Although only eight input and output interface sections 58 and 36, respectively, are illustrated, it is contemplated that a total of 256 discrete inputs and outputs could be implemented if binary/digital encoding were employed.

The regulated power supply 20 is of standard construction, the input of which is electrically connected to a source of AC line voltage and the outputs are electrically connected as indicated. The plus and minus 12 VDC output interconnections to the microprocessor 14 and the operator's panel are not illustrated for the sake of simplicity.

Referring to FIG. 2A, a typical power versus time curve for a large number of machine cycles is illustrated. Each cut of the machine tool is reflected in a peak of power drawn by the machine tool. When the cut is completed, the curve returns to reflect the idle power drawn by the machine tool. A trend line drawn tangentially to each peak illustrates how power required for each cut gradually increases as the tool dulls. The idle power of a machine tool actually tends to decrease over a period of time as the machine warms up. By studying the power time curve of a given cutting tool, its wear life can be accurately, quantitatively predicted and the machine shut down or the operator warned prior to actual failure of the tool.

Figure 2B:
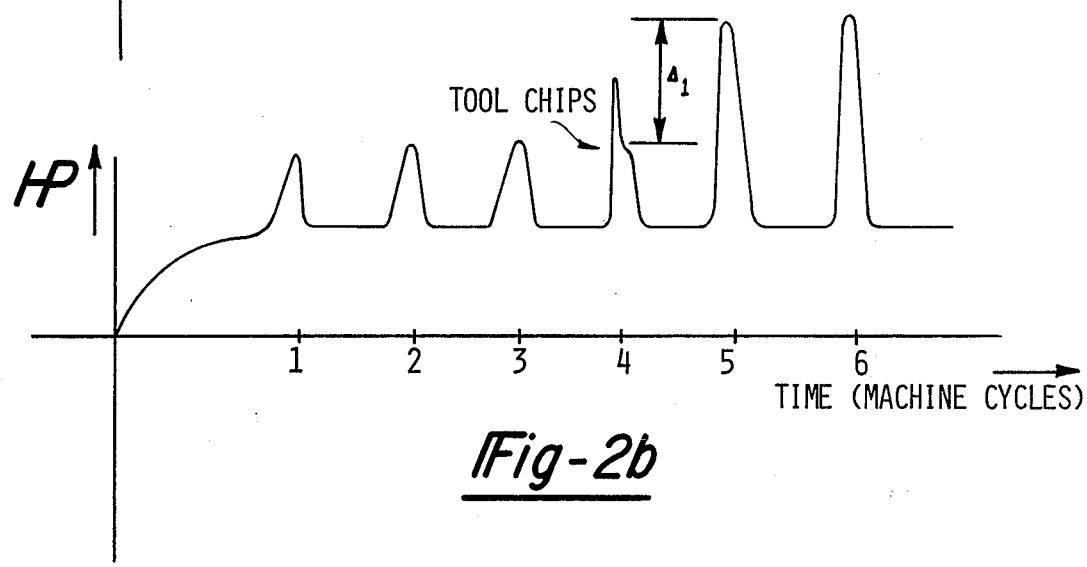
FIG. 2B is a power-time curve illustrating the situation where a cutting tool chips.

Referring to FIG. 2B, the effect on the power time curve by the chipping of a tool is illustrated. For example, during the fourth cycle of operation the tool chips, causing a substantially instantaneous pulse which will be filtered out by the power monitor. During the next cycle of operation, because the tool is chipped, its cutting efficiency will be impaired and substantially more electrical power will be dissipated in the subsequent cut. The absolute value of the increase of power between cut 4 and cut 5 as indicated by $\Delta_1$, will exceed a predetermined set point and trigger an output signal.

Figure 2C:
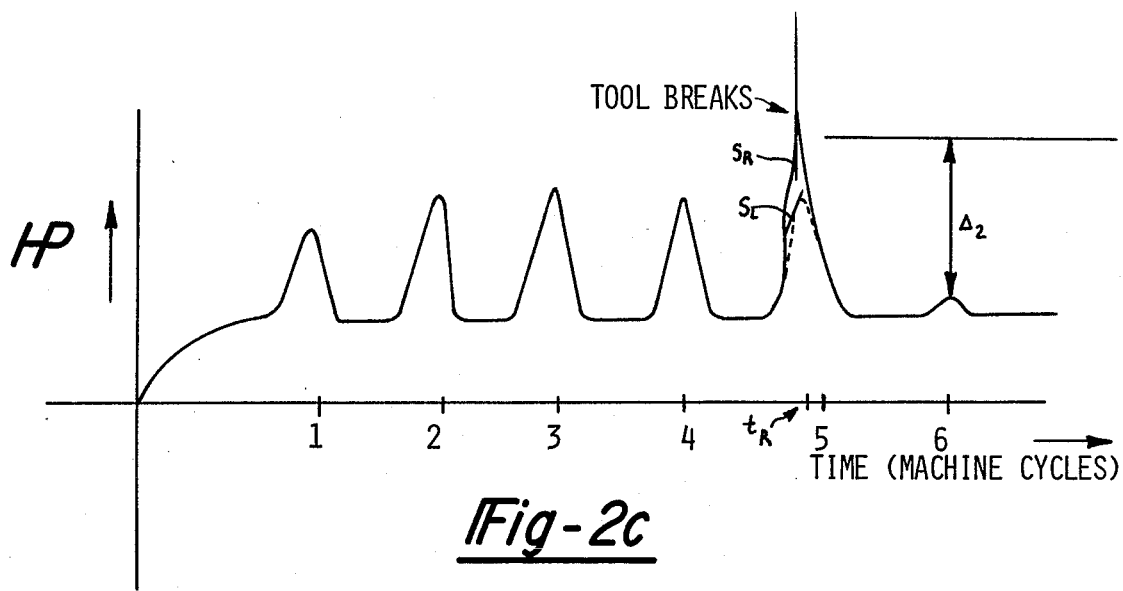
FIG. 2C is a power-time curve illustrating the situation where a cutting tool breaks.

FIG. 2C illustrates the catastrophic failure of a tool wherein it ceases cutting altogether. In the example, in cut 5, the tool breaks, causing a substantially instantaneous spike which, again, will be filtered out. On the subsequent cut however, there will be virtually no power increase inasmuch as to the tool does not make contact with the workpiece. The change in power indicated by $\Delta_2$ will trigger an output signal. Although peak values in the power versus time curve typically greatly exceed the magnitude of the idle power between the peaks, the peaks associated with the machine cycles after the tool breaks will be relatively small.

FIGS. 2B and 2C illustrate the detection of chipped and broken cutting tools by comparison of the peak values for subsequent cuts of a machine tool. The preferred embodiment of the invention can also analyze one wave form associated with a single cut by storing and comparing intermediate values and slope information of the power versus time curve during the learn and run modes. For example, referring to FIG. 2C, at a particular point of time $t_R$ on the fifth cut during the learn mode, the curve has a particular slope $s_L$. The slope is calculated and stored in memory by means well known in the art. During the run mode on the fifth cut, the slope $s_R$ is again calculated and compared with $s_L$. If the difference between the two exceeds a predetermined limit an alarm is sounded and/or the machine is shut down.

In operation, the preferred embodiment of the invention monitors the total power consumption of a machine tool along with other possible inputs such as the temperature of the cutting tool, and compares this data with information stored in the microprocessor memory during a self-learning programming mode. When the comparison reaches limits or can be projected to be approaching limits set during the learning mode, an alarm is given, or if desired, the machine is shut off. The alphanumeric display and keyboard on the operator's panel allow two-way communication between the operator and the system.

The system is programmed by placing it in the learn mode and performing the desired machining operation or operations. The system will request information from the operator during this phase and the operator responds by entering the appropriate data or responses via the keyboard. A number of operations are made until the tool either breaks, wears out or in the operator's opinion, becomes unusable. The system then analyzes the data obtained and reduces it to an algorithm which is stored in microprocessor memory for further reference. After the programming operation, the system is switched to a run mode whereby the system will analyze the input data and compare it with the stored data, during the machining operation. The system will respond with an alarm or shut down the machine if the data does not match within preset limits of that stored within memory.

Figure 3:
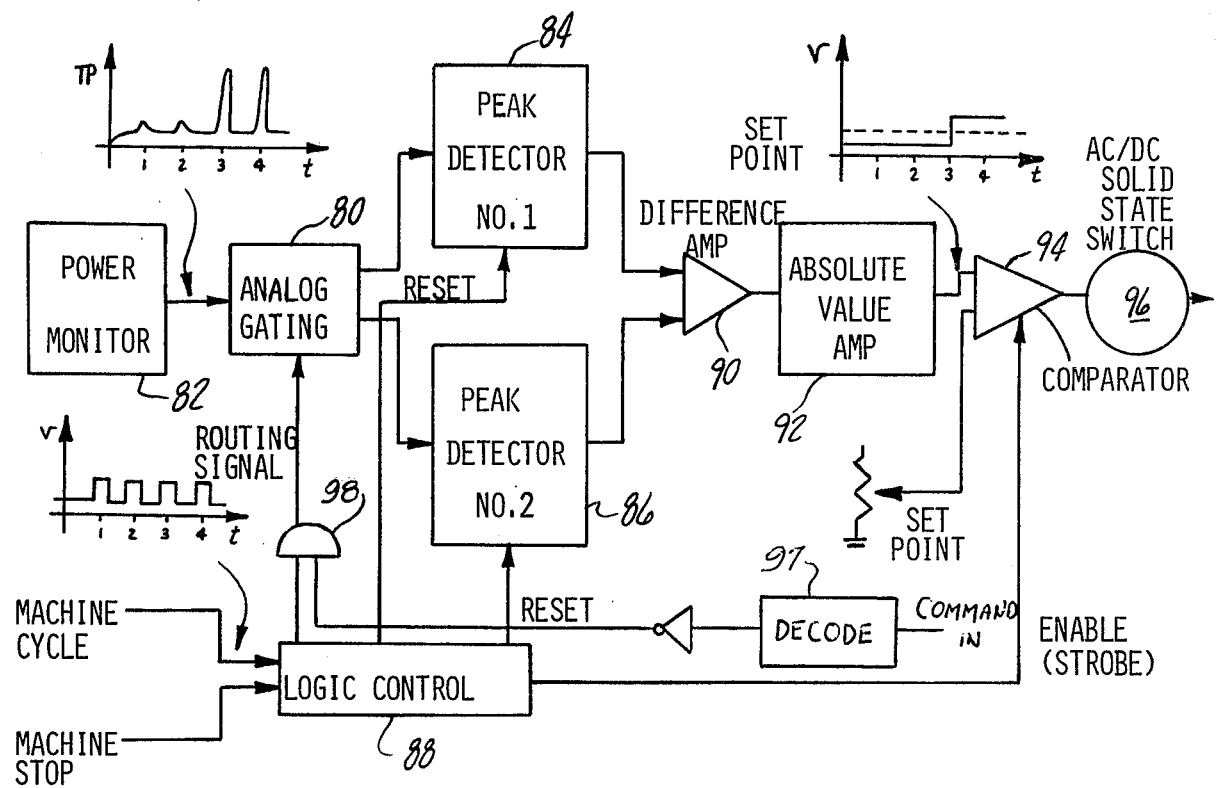
FIG. 3 is a block diagram of an analog alternative embodiment of the invention.

Referring to FIG. 3, an alternative embodiment of the invention is illustrated employing analog circuitry. A power monitor 82 is electrically connected to the power bus of a machine tool as described hereinabove and generates an input signal to analog gate 80. The analog gate 80 has two outputs, a first output which is connected to a first peak detector 84 and a second output which is connected to a second peak detector 86. These detectors 84 and 86 track the analog signal and hold the peak value thereof until reset. A logic control circuit 88 receives machine cycle and machine stop signals from the control circuitry of the machine tool. The machine cycle signal supplies the timing function in the form of a routing signal which is transmitted from the logic control 88 to the analog gate 80. The analog gate 80 therefore acts as a bistable switch which is triggered at each machine operation. The value of each successive peak of the power curve is therefore alternatingly stored in the two peak detectors 84 and 86. The outputs of the peak detectors 84 and 86 are connected to the two inputs of a difference amplifier 90 which generates an output signal as a function of the difference between the two input signals. The difference signal is fed to an absolute value amplifier 92 which in turn feeds one of the input terminals of a comparator 94. The absolute value amplifier 92 is included to insure that the difference signal has a positive value when injected into the first input of the comparator 94. A predetermined set point reference voltage is fed to the other input of the comparator 94. Thus, the set point establishes a threshold value which, if exceeded by the absolute value of the difference signal, will generate an output signal from the comparator. The output of the comparator 94 is connected to trigger a DC/AC switch 96 when its input is greater than set point signal. However, the comparator 94 will only have an output while receiving an enabling signal at the end of each cycle from the logic control 88. Additionally, each machine cycle alternatively resets one of the peak detectors 84 or 86 to zero signal level while presenting a logic signal to the analog gate 80 for routing the analog input signal to the previously reset peak detector. The closing of the DC/AC switch 96 indicates a chipped or broken tool. The switch 96 has an output which will warn the operator and/or de-energize the machine tool.

When a device according to the present invention is used in conjunction with a programmable machine tool, such as a numerically controlled (NC) machine center, there may be additional problems associated with the detection of the condition of a cutting tool. The machine control programs used with this type of machine often provide for a rapid change in machine spindle speed to accommodate the required machining operations. Such a speed change will often cause an instantaneous increase in power for a short period of time to reflect the power initially required to effect the speed change. When this condition occurs, a device according to this invention could confuse the instantaneous power draw with that associated with a dull, chipped or broken tool.

FIG. 3 illustrates a simple hard-wired apparatus for screening out spurious power consumption signals which are produced by program requirements and distinguishing them from power spikes produced by broken or worn tools.

In FIG. 3 an NC command decoder 97 receives program commands from the tape reader buffer storage and decodes only those commands which call for an increase in tool rotational speed. These commands result in an output which is inverted and applied to one input of AND gate 98 connected in the signal path between logic control unit 88 and analog gate 80. Thus, a speed change command from the NC or CNC (computerized numerically controlled) program produces a high signal from decoder 97 which, after inversion, disables gate 98 to prevent the operation of gate 80.

Obviously, various implementations, including software approaches, may result in the signal discrimination provided by the command decoder 97 and gate 98; accordingly, the foregoing description is to be considered exemplary only.

Figure 4:
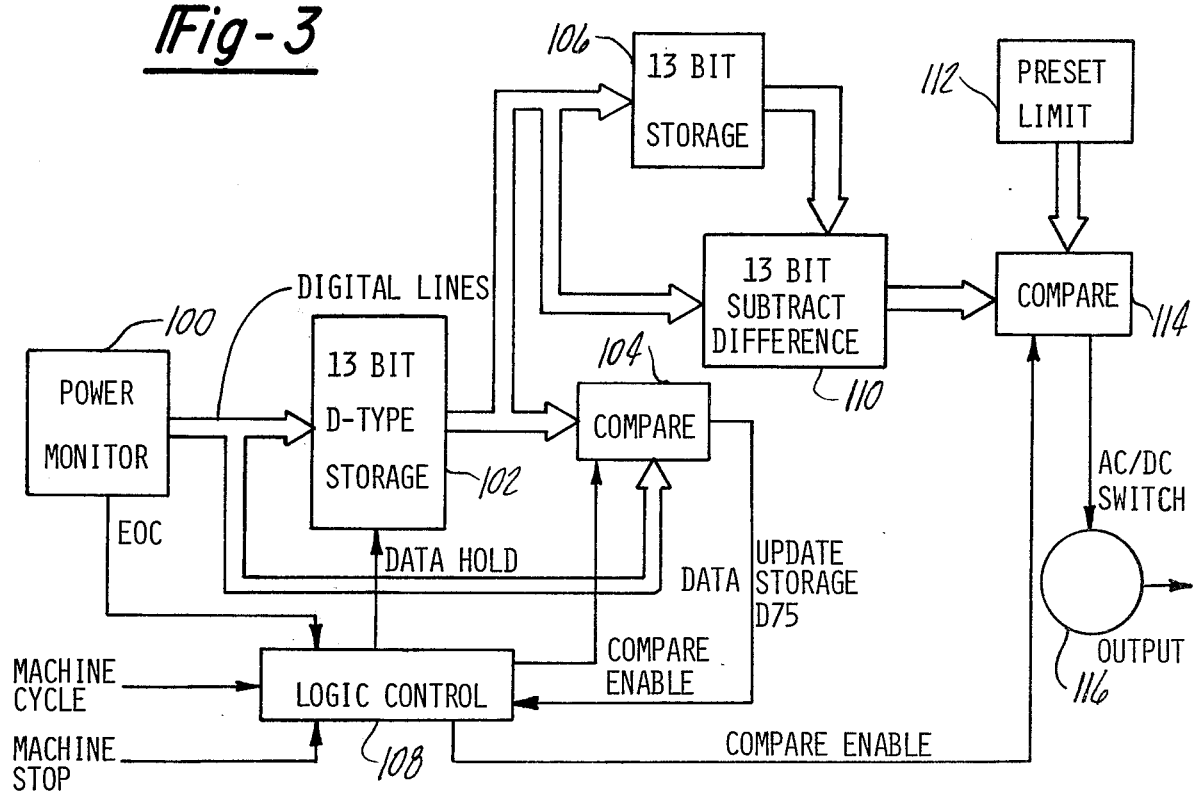
FIG. 4 is a block diagram of a digital alternative embodiment of the invention.

Referring to FIG. 4, a second alternative embodiment of the invention is illustrated which employs an all digital system. The digital embodiment of the invention is advantageous when it is desired to store information for long periods of time without appreciable signal droop. Additionally, the digital version has a higher noise immunity than the analog version. A power monitor 100 is connected to a machine tool as described hereinabove. The output of the power monitor 100 is a 13-bit word that is updated after each cycle of operation and an end of conversion (EOC) pulse which is generated at each new update. This word is stored in a 13-bit D-type storage register 102 and simultaneously compared with the previous word in a comparator 104. If the new word is larger than the stored word, the new word replaces the stored word. By repeating this process, a peak value can be found and maintained in the storage register 102. At the end of each machine cycle, a logic control circuit 108 pulses the 13-bit D-type storage register 102, causing the peak value stored therein to be transmitted into a second 13-bit storage register 106. During the following cycle, the input 13-bit D-type storage register 102 tracks and holds a new peak value. At the end of the next cycle of operation, the old peak value stored in the storage register 106 and the new peak value stored in storage register 102 are subtracted from one another in a 13-bit subtraction register 110. The output of register 110 is the difference between the two compared peak values, which is compared with a preset limit value 112 in a comparator 114. If the preset limit 112 is less than the difference output of register 110, a DC/AC switch 116 is energized during an enable pulse from the logic control 108. As described above, when DC/AC switch 116 is energized, an alarm is sounded to warn the operator and/or the machine is de-energized, indicating a chipped or broken tool.

It is to be understood that the invention has been described with reference to specific embodiments which provide the features and advantages previously described and that such specific embodiments are susceptible to modification, as will be apparent to those skilled in the art. Accordingly, the foregoing is not to be construed in a limiting sense.

The embodiments of the invention in which an exclusive property or privilege is claimed are defined as follows:

1. A method of detecting broken, chipped and worn cutting tools in a machine tool carrying out successive cuts for removing stock, said method comprising the steps of:
    monitoring the electrical power dissipated by said machine tool during different time intervals during the same cut and generating signals proportional thereto;
    storing said signals in temporary storage devices;
    comparing the signals and determining the difference therebetween which is indicative of the slope of the power dissipated by the machine tool during one cut; and
    generating an output signal when said difference exceeds a predetermined limit value.

2. In an apparatus for detecting failures of a tool in a cutting machine, said machine having a motor and means for cycling the tool so as to engage a workpiece to make a cut therein, wherein the improvement comprises:
    power monitoring means for sensing the power consumed by said machine during different time intervals;
    limit value selection means for providing a limit value representative of the maximum desirable deviation of the machine power consumption between selected time intervals during the same cut;
    first storage means coupled to said power monitoring means for storing the sensed machine power consumption at a first time interval during a cut;
    second storage means coupled to said power monitoring means for storing the sensed machine power consumption at a second time interval during the same cut;
    difference means coupled to said first and second storage means for providing a signal indicative of the difference between the contents of said first and second storage means representative of the slope of the machine power consumption during one cutting cycle; and
    comparator means having one input coupled to said limit value selection means and another input coupled to the output of said difference means wherein said comparator means provides an output signal indicative of tool failure if the output from said difference means exceeds said limit value.

3. In an apparatus for detecting failures of a tool in a cutting machine having a motor and means for cycling the tool so as to engage a workpiece to make a cut therein, wherein the improvement comprises:
    power monitoring means for sensing the power consumed by said machine during different time intervals;
    limit value selection means for providing a limit value representative of the maximum desirable deviation of the machine power consumption between selected time intervals;
    first storage means coupled to said power monitoring means for storing the sensed power machine consumption during a first time interval;
    second storage means coupled to said power monitoring means for storing a sensed power consumption during a second time interval;
    difference means coupled to said first and second storage means for providing a signal indicative of the difference between the contents of said first and second storage means;

comparator means having one input coupled to said limit value selection means and another input coupled to the output of said difference means wherein said comparator provides an output signal indicative of tool failure if the output from said difference means exceeds said limit value;

machine cycle sensing means for sensing the beginning of each machine cycle;

control means coupled to said machine cycle sensing means, said control means providing an interface between said power monitoring means and said first and second storage means; and said control means switching the output of said power monitoring means between first and second storage means upon receipt of a signal from said machine cycle sensing means.

4. The improvement of claim 3 wherein said machine further includes program means for providing a change in motor speed, with the improvement further comprising:

means coupled to said program means and said control means for disabling said power monitoring means from said first and second storage means to thereby distinguish the resulting increase in power consumption due to the increase in motor speed from the increase in power consumption that may otherwise be representative of tool failure.

* * * * *